United States Patent [19]

Anderson

[11] 4,216,178

[45] Aug. 5, 1980

[54] PROCESS FOR PRODUCING SODIUM AMALGAM PARTICLES

[76] Inventor: Scott Anderson, P.O. Box 2680, Champaign, Ill. 61820

[21] Appl. No.: 654,416

[22] Filed: Feb. 2, 1976

[51] Int. Cl.² ............................................... B01J 2/04
[52] U.S. Cl. ................................................. 264/9
[58] Field of Search .................................... 264/9, 28

[56] References Cited

U.S. PATENT DOCUMENTS 3,676,534  7/1972  Anderson ................................ 264/9

*Primary Examiner*—Donald J. Arnold
*Assistant Examiner*—James R. Hall
*Attorney, Agent, or Firm*—L. Lawton Rogers, III

[57] ABSTRACT

Substantially pure, free flowing, sodium amalgam particles of predetermined composition and controlled particle size are prepared for use as vaporizable fill for high pressure discharge lamp devices, whereby accurately measurable quantities of the sodium amalgam may be introduced into the lamp devices. A process for producing the substantially pure amalgam particles of accurately controlled size includes heating a mixture of sodium and mercury to form a melt, passing the melt through a vibrating discharge nozzle and subjecting the droplets so formed to an inert cooling fluid maintained at a temperature below the solidification point of the amalgam. An apparatus for producing the amalgam particles comprises a vessel to contain an alkali metal amalgam melt, a vibrating discharge nozzle adapted to form the melt into uniformly sized droplets, and a column of inert cooling fluid maintained at a low temperature at which the melt droplets are solidified.

15 Claims, 3 Drawing Figures

PROCESS FOR PRODUCING SODIUM AMALGAM PARTICLES

BACKGROUND OF THE INVENTION

The fabrication of gas discharge lamps requires that precise quantities of high purity mercury and alkali metals (e.g., sodium) be introduced into the gas envelope of the lamp. Of particular interest in recent years are high pressure sodium lamps which require vaporizable fills of sodium and mercury. These lamps have assumed commercial importance because of their high efficiency, typically in the range of 100 to 120 lumens per watt. The light output of high pressure sodium lamps is characterized by strong continuum radiation and a line spectrum richer than that associated with conventional mercury vapor lamps. High pressure sodium vapor lamps have been found particularly useful and effective in anti-crime lighting systems deployed in many urban areas.

A high pressure sodium vapor discharge may be created within a discharge tube formed from a high temperature, alkalivapor resisting translucent polycrystalline alumina envelope with generally oppositely disposed electrodes. The operating pressure may range from 100 to 120 torr. Sodium, among the alkali metals, provides a high pressure discharge of the highest luminous efficiency and has relatively good spectral distribution. Mercury may be added to the sodium in the discharge tube as a buffer gas. Commonly a noble gas at approximately 15 torr pressure is placed in the tube as a starting gas.

In the preparation of these lamps, molten sodium-mercury amalgam has been dispensed into the gas envelope of the lamp by means of a vacuum needle pick-up. This technique is ineffective and poorly adapted to use on high volume manufacturing lines for several reasons. First, the ambient surroundings, materials, and equipment associated with the dispensing operation must be maintained at elevated temperatures, typically from 66° to 220° C., in order that the amalgam may remain in a molten state. Also, since the molten amalgam is extremely susceptible to oxide formation and since sodium will react with water, the dispensing operation must be performed in a controlled, inert water-free atmosphere. Finally, dosing needles employed to dispense the molten amalgam are continually clogged by sodium oxide floats or by decomposition of the needle itself from reaction with the corrosive alloyed sodium. The dosing of improper quantities of mercury and vaporizable sodium is a principal cause of high lamp rejection rates (often about 50 percent or more) associated with this process. There is also a health hazard associated with the use of a hot amalgam if the system should break and get toxic mercury in the atmosphere. In addition, hot sodium can explode if there is sufficient moisture in the atmosphere.

Another disadvantageous dosing procedure practiced by other lamp assemblers entails dispensing a carefully measured quantity of liquid mercury into a gas envelope of a lamp, inserting an open ended tantalum tube containing a measured quantity of solid sodium metal into the gas envelope, sealing the gas envelope, and heating the tantalum tube with a high frequency generator to vaporize the sodium. The procedure has several obvious disadvantages. First the liquid mercury may be partially retained in dosing conduits, thereby varying the composition of the fill. Sodium, exposed on the ends of the tantalum tube, may oxidize, thereby also varying the composition of the fill. Any sodium which is oxidized does not form an amalgam with the mercury. The procedure is a time consuming, multi-stage operation requiring the performance of two measuring and two dispensing steps, the sealing of the gas envelope, and the application of high frequency energy to vaporize the sodium. Finally, the lamp fabricated by this procedure will contain an extraneous piece of tantalum tubing within its gas envelope.

A need remains in the art for a fast, relatively simple and accurate procedure of dosing sodium amalgams into gas lamps envelopes.

An advantageous process and apparatus for the manufacture of discrete particles of metal halide particles is disclosed in U.S. Pat. No. 3,676,534.

OBJECTS AND SUMMARY OF THE INVENTION

Accordingly, it is an object of the present invention to provide a method for making a sodium amalgam of controllable composition and negligible impurity content in a form adapted for convenient dosing of electric discharge lamps in an assembly line environment and the resulting product.

Another object of the present invention is to provide a method for forming free-flowing sodium amalgam particles of controllable particle size, the resulting product and a method of using the product to dose a lamp with a predetermined amalgam composition.

In accordance with one aspect of the present invention, there are provided free flowing, discrete sodium amalgam particles composed of from about 2 to about 30 weight percent sodium and from about 98 to about 70 weight percent mercury, said particles containing less than 10 ppm of sodium oxides. Preferably, the amalgam is composed of from about 10 to about 26 weight percent sodium and concomitantly from about 90 to about 74 weight percent mercury. The sodium oxide content of vaporizable fill used in lamp fabrication is of particular importance because sodium oxide tends to form a compound deleterious to lamp performance when it comes in contact with conventional lamp gas envelopes.

In another aspect of the present invention, there is provided a method for filling a gas discharge lamp with an accurately controllable quantity of high purity sodium amalgam, comprising: portioning out a volume of free-flowing sodium amalgam particles corresponding to a desired quantity of sodium amalgam; and introducing said volume of amalgam particles into a gas envelope of a gas discharge lamp.

In accordance with another aspect of the present invention, there is provided a method for producing free-flowing, discrete sodium amalgam particles of controlled particle size and low sodium oxide content comprising: heating a mixture of sodium and mercury in a vessel to form an amalgam melt of determinable unoxidized sodium content, withdrawing a portion of said melt from the vessel at a point other than at an upper surface of said melt; and passing the withdrawn portion of said melt through a vibrating discharge conduit into an inert, quenching atmosphere to form particles of said amalgam. The inert quenching atmosphere may be dry gaseous helium where the gaseous helium is maintained at a temperature of less than minus 150° C., by indirect heat exchange with liquid nitrogen or may be substantially water-free liquid nitrogen.

In accordance with another aspect of the present invention, a novel apparatus is provided particularly adapted for the production of said sodium amalgam particles. The apparatus may comprise a heated vessel for containing the amalgam melt means for forming said amalgam into droplets comprising a vibrating conduit through which the molten amalgam may exit the vessel by a pressure gradient established by an inert pressurized fluid in the apparatus, and a column of inert cooling fluid for receiving the droplets. The inert cooling fluid is maintained at a temperature sufficiently to solidify the droplets. The column of inert cooling fluid may comprise a column of substantially water-free liquid nitrogen or a column of inert cooling fluid being substantially surrounded by and in indirect heat exchange relationship with a liquid bath (such as liquid nitrogen) to maintain the inert cooling fluid at the desired temperature. In a preferred embodiment, the vibrating conduit is a bore in a lower wall of the heated vessel, which bore is vibrated by an electro-mechanical transducer and which has an exit end including a concave indentation having a hole through which the amalgam exits the lower wall of the heated vessel. The bore may also contain sumps disposed below the hole in the concave indentation to trap relatively heavy impurities.

These and other aspects and advantages of the present invention will be readily apparent to one skilled in the art to which the invention pertains from the claims and the following more detailed description of a preferred embodiment when read in conjunction with the appended drawings.

DESCRIPTION OF THE PREFERRED EMBODIMENTS

Figure 1:
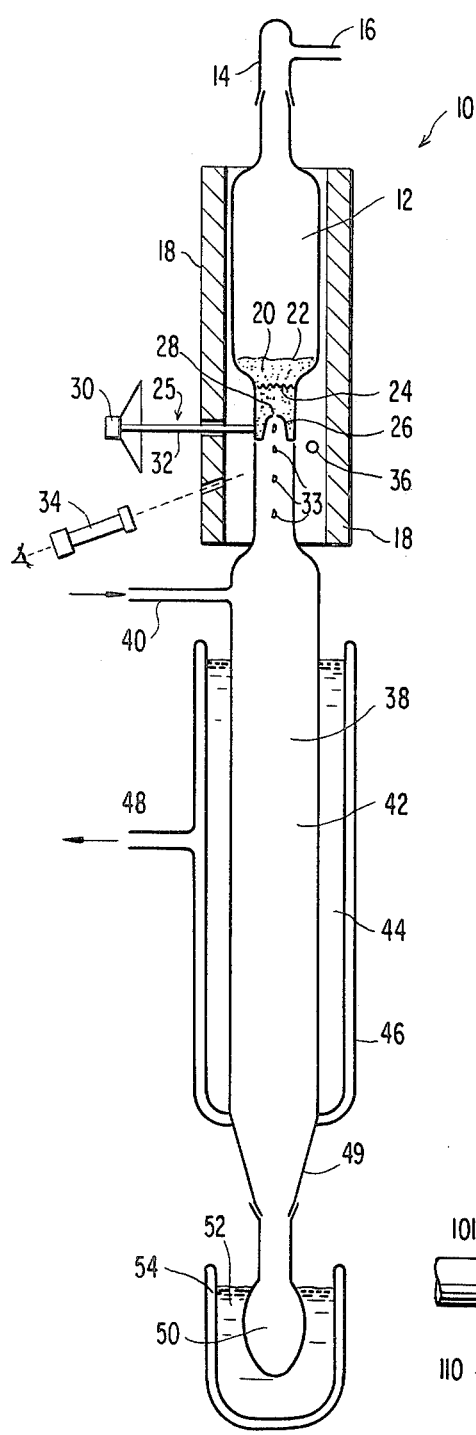
FIG. 1 is a schematic representation of an apparatus which may be employed to produce substantially pure, free-flowing, alkali metal amalgam particles in accordance with the present invention.

Referring to FIG. 1, a purification vessel, denoted generally by the numeral 10, and generally formed of an inert material such as silica, nickel or stainless steel, has an upper vessel section 12 for holding the amalgam 20 and means 25 for vibrating the lower end thereof. The upper vessel section 20 has a removable upper vessel section cap 14 which may be removed to permit mercury and sodium or a preformed sodium amalgam to be introduced into the upper vessel section. The upper vessel section cap 14 is provided with an outlet 16 for the egress of various gases therefrom. The upper vessel section 12 is substantially surrounded by a conventional furnace 18 to heat and maintain the melt above the melting point of the amalgam.

The upper vessel section 12 terminates in a nozzle 26 formed with an aperture 28 through which molten amalgam may exit the upper vessel section. A silica or stainless steel filter 24 may be disposed above the nozzle 26. The vibrating means 25 may consist of an electromagnetic transducer 30 mechanically connected to nozzle structure 26 by a quartz rod 32 whereby vibrations are transmitted to the molten amalgam as it passes through aperture 28, separating the molten amalgam into discrete droplets 33 of controlled particle size. The size and positioning of the discrete droplets are observed by optical means 34 under the illumination of stroboscopic light source 36.

The upper vessel section 12 is hermetically sealed in axial relationship with a lower vessel section 38 which comprises a cooling gas inlet 40, a condensation chamber 42 and a collection chamber 50. The droplets 33 of molten amalgam fall freely through condensation chamber 42 containing an inert cooling fluid to solidify the droplets into solid amalgam particles of regular size and shape. The cooling fluid, which may be introduced into lower vessel section 38 through gas inlet 40, may be maintained at a temperature well below the melting point of the amalgam by indirect heat exchange with a coolant jacket 44, typically containing liquid nitrogen, which coolant jacket 44 may be surrounded by an evacuated insulation jacket 46. A vacuum is induced in the insulation jacket 46 by application of suction through vacuum draw tube 48.

In a preferred embodiment of the present invention, solidified particles of amalgam exit lower vessel section 38 through funnel 49 and enter a cooled collection receptacle 50. The collection receptacle 50 is maintained at a temperature well below the melting point of the amalgam by second coolant jacket 52, typically containing liquid nitrogen and surrounded by a second evacuated, thermal insulation jacket 54.

In operation, the upper vessel section 12 may be heated to a temperature above the melting point of the sodium amalgam. A vacuum may be applied through outlet 16 by conventional suction means (not shown) while the upper vessel section is being heated. When the upper vessel section 12 is heated to the desired temperature, an inert gas (such as argon) is passed through gas inlet 40 and withdrawn through outlet 16 at a pressure sufficient to maintain the amalgam in the upper vessel section 12. While the argon is thus flowing through the aperture 28 and upper vessel section 12, the cap 14 may be removed and solid sodium inserted into the upper vessel section 12. The sodium melts inside the upper vessel section 12 and the flowing argon gas pressure maintains the molten sodium in the upper vessel section 12. Mercury is added incrementally to the molten sodium because of the large amount of heat evolved when mercury is added to sodium. After the desired amount of mercury is added, argon flow may be continued until the amalgam melt is cooled to the desired temperature. The sodium amalgam may also be added to the upper vessel section 12 as a pre-formed amalgam. When so added, the pre-formed amalgam is heated in the upper vessel section 12 under inert gas flow and formed into discrete particles in the same manner as an amalgam formed in the upper vessel section 12.

Thereupon, an inert cooling fluid such as helium is placed in the lower vessel section 38 and in the upper vessel section 12 so that the molten amalgam is forced downwardly through the nozzle 26 and separated by vibration as it passes through the aperture 28 into the discrete droplets 33 of controlled particle size.

The inert cooling fluid in the lower vessel section 38 is maintained at a temperature well below the melting point of the sodium amalgam and sufficient to solidify the particles. The present invention is particularly suited to the production of sodium amalgams containing from about 2 to about 30, preferably from about 10 to about 26, weight percent sodium and, concomitantly, from about 98 to about 70, preferably from about 90 to about 74, weight percent sodium. Relatively pure sodium and mercury or sodium amalgam should be utilized in order to maintain the purity of the final product particles as high as possible. Preferably, the sodium is relatively potassium free (i.e., contains less than 100 ppm potassium) and the mercury is triple distilled. These amalgams have melting points in the range of from about 50 to about 353, preferably from about 60 to about 220° C. The inert cooling fluid in the lower vessel section is generally maintained at a temperature below minus 150° C., preferably below about minus 180° C. The boiling temperature of the liquid nitrogen in coolant jacket 44 is minus 196° C.

Figure 2:
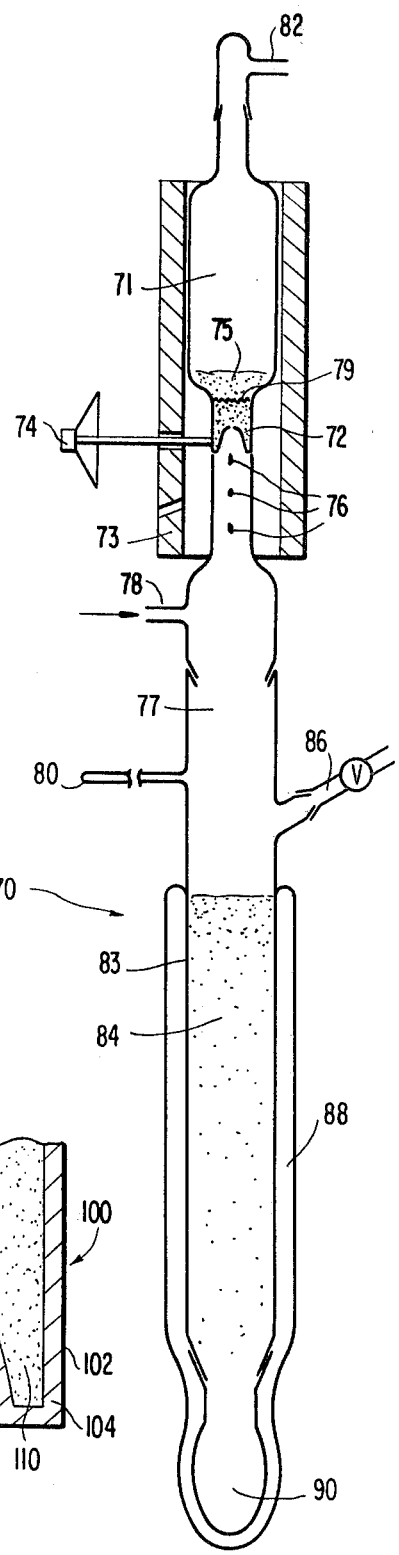
FIG. 2 is a schematic representation of an alternate embodiment of an apparatus which may be employed to produce substantially pure, free-flowing, alkali metal amalgam particles in accordance with the present invention.

Referring to FIG. 2, a purification vessel of an alternate embodiment of the present invention is denoted generally by the numeral 70. The embodiment utilizes an upper vessel section 71, nozzle 72, conventional furnace 73, and electromechanical transducer 74 in substantially the same configuration as the equivalent elements of the embodiment depicted in FIG. 1. In the alternate embodiment of FIG. 2, molten amalgam 75 may pass through nozzle 72 and is formed into droplets 76 of generally uniform size. The droplets may then pass into a volume 77 containing an inert gas (e.g., helium) which enters the purification vessel via inert gas input conduit 78 and which exits the purification vessel through inert gas egress conduit 80. Said inert gas may also exit the purification vessel by passing through upper vessel section 71 and exiting via gas outlet 82. After passing through volume 77, amalgam droplets contact an inert cooling liquid 84, typically dry, high purity, substantially water-free liquid nitrogen in lower vessel section 83 which inert cooling liquid is maintained at a temperature sufficient to solidify the amalgam droplet particles. The lower vessel section 83 may be provided with a collection receptacle 90 for receiving solidified amalgam particles. The apparatus of FIG. 2 is otherwise constructed similar to and may be utilized in the same manner as the apparatus of FIG. 1.

Figure 3:
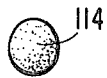
FIG. 3 is a cross-sectional elevation of a nozzle structure employed to produce droplets of substantially pure alkali metal amalgam melt in accordance with the present invention.

Referring to FIG. 3, a nozzle structure which may be advantageously employed to form regular sized droplets of molten amalgam is denoted generally by the numeral 100. Vibrating means 101 causes nozzle 102 to transmit vibrations to molten amalgam 110 and thereby cause the molten amalgam to separate into discrete droplets 114 to regular size. Surface tension draws the molten amalgam droplet into substantially spherical form.

The frequency of the vibrations and the velocity of the stream 112 of molten amalgam issuing from nozzle 102 causes predictable separation of the continuous stream into individual droplets 114.

The theory of producing orderly drop formation from a liquid jet by use of a controlled vibration was discussed in detail by Lord Rayleigh in 1877 in *Theory of Sound*, 2nd Edition, Vol. II; Chapter 20, New York, Dover Publications. Rayleigh showed that the optimum droplet size uniformity is achieved when the wavelength, $\lambda$, of the imposed vibrations is equal to approximately 4.5 times jet diameter, $\phi_j$.

$$\lambda = 4.5 \phi_j \tag{1}$$

Assuming a design choice of uniform droplets with a radius R, the volume of each such droplet is given by the expression $$4/3\pi R^3. \tag{2}$$

The contraction of an amalgam droplet on solidification is slight and can be neglected, so that the volume of said particle is approximately equal to the volume of the droplet.

The volume of the formed droplet is equal to the volume of liquid contained in one wavelength, $\lambda$, of the molten amalgam stream 112 before it breaks into droplets. To a first approximation, this volume is given by the expression $$\pi r_j^2 \, 4.5 \cdot 2 r_j, \tag{3}$$

where $r_j$ is the radius of the amalgam stream as it leaves the nozzle. Neglecting the contraction coefficient of the melt, $r_j$ will equal the radius of the nozzle. Since the volume of the droplet is equal to the expression (3):

$$4/3 \pi R^3 = 9 \pi r_j^3 \tag{4}$$

and therefore $$r_j = \sqrt[3]{4/27} \, R = 0.53 R. \tag{5}$$

Thus, for example, to produce a solid particle with a radius R, a nozzle aperture with a radius of a magnitude of approximately R/2 should be chosen.

When forming droplets the frequency, f, of the vibrating transducer and velocity of the amalgam stream, V, should be maintained at values which will establish a wavelength approximately equal to 4.5 $\phi_j$. This can be done because $$f = v/\lambda = \sqrt{2g\Delta p}/\lambda, \tag{6}$$

where $\Delta p$ = the pressure differential in the direction of a principle axis of the aperture in the nozzle and g = the acceleration due to the force of gravity. Optimum results and best droplet size control are achieved where the frequency of vibration is given by the expression $$\sqrt{2g\Delta p}/4.5\phi_j. \tag{7}$$

The droplet size can be varied somewhat by changing $\Delta p$ and f. However, for a reasonable yield of uniform particles, the wavelength should be limited according to the expression $$3.6\phi_j \leq \lambda \leq 6.2\phi_j \tag{8}$$

Droplet uniformity, size control, and purity may be improved by employing the nozzle structure depicted in FIG. 3. In that embodiment, upper vessel section wall 104 may have an inwardly concave indentation 106 in a lower portion of said vessel wall.

An upper portion of the concave indentation 106 may be formed with at least one bore 108 with an entrance end 109. The upper vessel section may be formed with sump volumes, 110, which volumes are lower than the entrance end 109 of the bore 108 and which volumes may serve to trap relatively heavy impurities which may sink to the bottom of the melt.

The filter 24 (FIG. 1) or 79 (FIG. 2) disposed in the upper vessel section above the nozzle 26 (FIG. 1) or 72 (FIG. 2) serves to remove any solid impurities, e.g., sodium oxide, carbon or the like, within the melt. Any such solid impurities which pass through the filter and coming into contact with the inner walls of the concave indentation 106 will tend to sink by gravity and remain in the sump volumes 110. In this manner, the purity of the particles formed will be enhanced. The sodium amalgam particles of the present invention generally contain less than about 10 ppm of sodium oxide impurity.

The process and apparatus of the present invention are advantageously utilized to form discrete, free-flowing sodium amalgam particles of generally spherical form and having a diameter of from about 240 to about 480, preferably from about 315 to 385, microns. It has also been found that the particles produced are generally uniform in size for a given set of conditions. That is, essentially all of the particles (e.g., 90% or more) produced with a particular nozzle structure, vibration frequency, composition, temperature and the like, will be within about ±10% of the theoretical particle diameter.

The particles of the present invention offer substantial advantages in the production of sodium amalgam gas discharge lamps. For example, the amalgam composition used to dose the lamps is uniform. Dosing with the relatively small, uniformly sized particles of the present invention can easily be performed by machines at ambient temperature and can also be pre-calculated on a volume basis due to the uniformity of composition and size.

The invention is additionally illustrated in connection with the following Examples which are to be considered as illustrative of the present invention. It should be understood, however, that the invention is not limited to the specific details of the examples.

EXAMPLE 1

High purity, free-flowing sodium amalgam particles containing 17 weight percent sodium and 83 weight percent merciry and of generally uniform size are prepared employing the apparatus of FIG. 1 in the manner hereinafter set forth.

Upper vessel section 12 is heated to 125°–130° C. while being evacuated. This temperature is slightly above the melting point (about 118° C.) of the 17 weight percent sodium amalgam. The vessel is then filled with purified argon gas, which argon gas flows into the vessel via imput tube 40 and flows up through nozzle 26 to fill upper vessel section 12. While the argon gas is flowing, upper vessel section cap 16 is removed and a precisely weighed quantity of high purity solid sodium (containing less than 100 ppm. potassium) is placed on filter 24. The sodium melts inside the upper vessel section. The flowing argon keeps the melt on top of the filter. With argon flowing through the upper vessel section, triple-distilled mercury is incrementally introduced into the upper vessel section a small amount, e.g., ½ to 1 cc., at a time until a sufficient quantity (83 weight percent of the resulting amalgam) has been added. The mercury is added slowly because a great amount of heat is evolved in the amalgam formation.

After adding mercury, helium is passed up through the molten amalgam for ½ hour to cool the amalgam to 125° C. Thereafter, 7.9 psi of helium is placed in the upper vessel section 12 above the amalgam while 2.2 psi of helium is maintained within the coolant column 38.

The pressure differential $\Delta p$, thereby created, forces the molten amalgam through the filter 24 and the nozzle which is vibrated at a frequency of 7.2 Hz using a conventional quartz rod 32 and a radio speaker 30, with a conventional variable oscillator and amplifier being used to drive the speaker. The molten sodium amalgam comes out of the nozzle in a continuous stream which then breaks up into individual droplets. The droplets solidify during their fall in the condensation chamber 42 containing high purity helium gas essentially at the temperature of the boiling liquid nitrogen (minus 196° C.) which surrounds the condensation chamber and is in indirect heat exchange with the inert helium cooling gas.

After the droplets have solidified by passing through coolant column 38, they are received in cooled collection receptacle 50. The product particles contained less than 10 p.p.m. of sodium oxide and had a particle size of from about 160 to 320 $\mu$ with 95% of the amalgam particles having a diameter being 220 and 275$\mu$.

A quantity of the sodium amalgam particles produced is introduced into a conventional aluminum oxide gas discharge lamp housing. The lamp is sealed (with a noble gas at about 15 torr pressure) and in operation shows excellent and uniform spectral properties and uniform starting potentials.

EXAMPLE II

High purity, high sodium content amalgam particles of generally uniform size are prepared employing the apparatus of FIG. 2. Using the procedure of Example I, a sodium amalgam containing 25 weight percent sodium, 75 weight percent mercury (melting point about 66° C.) is formed in the upper vessel section 75. Particles are formed in the manner of Example I.

The resulting particles have a size of from about 250 to about 425$\mu$ with 95% of the particles having a diameter between about 315 and 385$\mu$. The particles have a sodium oxide content of less than 10 p.p.m. and are used to dose a conventional sodium amalgam discharge lamp in the same manner as the particles of Example I. The resulting lamp exhibits excellent spectral properties and uniform starting potentials.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed:

1. A method for producing free-flowing, discrete sodium-amalgam particles of controlled particle size and sodium oxide content less than 10 p.p.m. comprising:

heating a mixture of sodium and mercury in a vessel to form an amalgam melt of determinable unoxidized sodium content;

withdrawing a portion of said melt from the vessel at a point other than at an upper surface of said melt; and passing the withdrawn portion of said melt through a vibrating discharge conduit into an inert, quenching atmosphere to form free-flowing, discreet particles of said amalgam.

2. The method of claim 1 wherein the inert, quenching atmosphere is composed of dry gaseous helium.

3. The method of claim 2 wherein said gaseous helium is maintained at a temperature less than minus 150° C.

4. The method of claim 3 wherein said gaseous helium is maintained at said temperature by indirect heat exchange with liquid nitrogen.

5. The method of claim 1 wherein the inert, quenching atmosphere is composed of substantially water-free liquid nitrogen.

6. The method of claim 1 wherein said amalgam contains from about 2 to about 30 weight percent sodium and concomitantly from about 98 to about 70 weight percent mercury.

7. The method of claim 6 wherein said amalgam contains from about 10 to about 26 weight percent sodium and from about 90 to about 74 weight percent mercury.

8. The method of claim 1 wherein said melt is filtered to remove solid impurities prior to passing through said vibrating discharge conduit.

9. The method of claim 1 wherein said mixture of sodium and mercury is formed by heating the vessel to a temperature above the melting point of the amalgam, adding sodium to said vessel and thereafter adding mercury in incremental form to said sodium to form the amalgam, at least the additions of sodium and mercury being conducted while an argon atmosphere is maintained in the vessel.

10. The method of claim 1 wherein said sodium contains less than about 100 p.p.m. of potassium and said mercury is triple-distilled to remove impurities therefrom.

11. A method for producing free-flowing, discrete particles of a sodium amalgam containing from about 10 to about 26 weight percent sodium, balance essentially mercury which comprises:
heating a mixture of said sodium and mercury in a vessel to a temperature above the melting point of the sodium amalgam while passing argon gas therethrough,
filtering the sodium amalgam melt to remove solid impurities therefrom,
passing the filtered melt through a vibrating discharge conduit to form said melt into droplets,
passing said particles through a quenching atmosphere of dry gaseous helium maintained at a temperature of less than minus 150° C. by indirect heat exchange with liquid nitrogen to solidify and cool said particles.

12. The method of claim 11 wherein said mixture of sodium and mercury is formed by heating sodium metal in said vessel to a temperature above the melting point of the sodium amalgam and incrementally adding mercury to said molten sodium.

13. The method of claim 12 wherein argon gas is passed through said molten sodium while said mercury is being incrementally added thereto.

14. The method of claim 11 wherein said sodium contains less than 100 ppm of potassium and said mercury is triple-distilled.

15. The method of claim 11 wherein said mixture of sodium and mercury is pre-formed amalgam.

* * * * *

UNITED STATES PATENT AND TRADEMARK OFFICE
CERTIFICATE OF CORRECTION

PATENT NO. : 4,216,178   Page 1 of 2
DATED : August 5, 1980
INVENTOR(S) : Scott Anderson It is certified that error appears in the above—identified patent and that said Letters Patent is hereby corrected as shown below:

In Column 2, lines 24 and 25, delete "and the resulting product".

In Column 3, line 5, following "melt", insert --,--;
    line 55, "20" should be --12--.

In Column 5, line 5, "sodium", first occurrence, should be --mercury--.

In column 6, formula (2) should read: $(4/3)\pi R^3$

In column 6, line 21, "nozzle" should be --aperture--.

In column 6, formula (4) should read: $(4/3)\pi R^3 = 9\pi(r_j)^3$

In Column 6, formula (5) should read: $(\sqrt[3]{4/27})R = 0.53R$

In Column 6, formula (6) should read: $f = v/\lambda = [\sqrt{2g(\Delta_p)}]/\lambda$ In Column 7, formula (7) should read: $[\sqrt{2g(\Delta_p)}]/4.5(\phi_j)$

UNITED STATES PATENT AND TRADEMARK OFFICE
CERTIFICATE OF CORRECTION

PATENT NO. : 4,216,178
DATED : August 5, 1980
INVENTOR(S) : Scott Anderson

It is certified that error appears in the above—identified patent and that said Letters Patent is hereby corrected as shown below:

In Column 7, line 42, "mirciry" should be --mercury--;

line 50, "imput" should be --input--;

line 52, "16" should be --14--.

In Column 8, line 3, "Hz" should be --KHz--;

line 17, "contained" should be --contain--;

line 18, "had" should be --have--.

Signed and Sealed this

Sixteenth Day of December 1980

[SEAL]

Attest:

Attesting Officer

SIDNEY A. DIAMOND

Commissioner of Patents and Trademarks